(12) United States Patent
Deval et al.

(10) Patent No.: US 7,453,797 B2
(45) Date of Patent: Nov. 18, 2008

(54) METHOD TO PROVIDE HIGH AVAILABILITY IN NETWORK ELEMENTS USING DISTRIBUTED ARCHITECTURES

(75) Inventors: Manasi Deval, Beaverton, OR (US); Suhail Ahmed, Beaverton, OR (US); Santosh Balakrishnan, Gilbert, AZ (US); Hormuzd Khosravi, Portland, OR (US); Sanjay Bakshi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 10/953,685

(22) Filed: Sep. 29, 2004

(65) Prior Publication Data
US 2006/0072480 A1  Apr. 6, 2006

(51) Int. Cl.
*H04L 12/26* (2006.01)
(52) U.S. Cl. ...................... 370/218; 370/412
(58) Field of Classification Search ................. 370/216, 370/220, 254, 255, 351, 238, 389, 395.31, 370/400, 401, 419; 709/220, 222, 227, 229, 709/249, 250
See application file for complete search history.

(56) References Cited

U.S. PATENT DOCUMENTS

| | | | | |
|---|---|---|---|---|
| 5,485,453 A * | 1/1996 | Wahlman et al. | ............ | 370/389 |
| 6,785,843 B1 * | 8/2004 | McRae et al. | ................ | 714/23 |
| 7,010,715 B2 * | 3/2006 | Barbas et al. | .................. | 714/4 |
| 7,065,038 B1 * | 6/2006 | Brandt et al. | ............... | 370/219 |
| 7,289,434 B2 * | 10/2007 | Fedorkow et al. | ........... | 370/219 |
| 7,292,535 B2 * | 11/2007 | Folkes et al. | ................ | 370/238 |
| 2005/0108416 A1 * | 5/2005 | Khosravi et al. | ............ | 709/232 |
| 2005/0135233 A1 * | 6/2005 | May | .......................... | 370/216 |

* cited by examiner

*Primary Examiner*—Ricky Ngo
*Assistant Examiner*—Gary Mui
(74) *Attorney, Agent, or Firm*—Blakely, Sokoloff, Taylor & Zafman LLP

(57) ABSTRACT

A method to provide high availability in network elements using distributed architectures. The method employs multiple software components that are distributed across data/forwarding plane and control plane elements in a network element. The software components in the data/forwarding plane include active and standby components. Components in the control plane a re provided to communicate with the components in the data/forwarding plane. A keep-alive messaging mechanism is used to monitor operation of the various elements in the network element. Upon detection of a failure to a hardware or software component, the data/forwarding plane and/or control plane elements are reconfigured, as applicable, to replace a failed active component with a corresponding standby component. This enables the network element to be reconfigured in a manner that is transparent to other network elements, and provided high availability for the network element.

11 Claims, 11 Drawing Sheets

METHOD TO PROVIDE HIGH AVAILABILITY IN NETWORK ELEMENTS USING DISTRIBUTED ARCHITECTURES

FIELD OF THE INVENTION

The field of invention relates generally to networks and, more specifically but not exclusively relates to techniques for providing high availability in network elements.

BACKGROUND INFORMATION

Continuation of the rapid growth in Internet and telecommunication usage experienced during the past decade is predicated on corresponding increases in network bandwidth. This places higher and higher demands on the network elements that make up the network, such as switches, routers, etc. The higher demands placed on networks, particularly high-bandwidth backbones, has lead to an increase in the number of network elements for a typical network, which, in turn, requires greater routing intelligence, longer routes (time-wise), and more sophisticated packet processing.

Under a typical communication between two endpoints at different geographic locations, data is encapsulated in the form of packets (e.g., TCP/IP (Transmission Control Protocol over Internet Protocol packets)) or cells (e.g., ATM (Asynchronous Transfer Mode) cells) to be transported via an underlying network protocol or protocol stack. The packets or cells are routed across a "virtual" communication path (route) in view of routing decisions made by the various network elements. Oftentimes, various packets corresponding to the same message are sent along different routes between the communicating endpoints and reassembled at the receiving endpoint to deliver the message.

Since network backbones and the like need to be available at all times, techniques have been developed to enable network elements to be added, removed, and temporarily shut down. This is facilitated, in part, via routing protocols that enable a given network element to be made aware of routes offered by other network elements. For example, "Hello" messages are used to facilitate the Open Shortest Path First (OSPF) and the Border Gateway Protocol (BGP) routing protocols. Hello messages containing routing information are exchanged between peers (e.g., adjacent network elements), and routing tables for each network element are updated in view of the routing information contained in the Hello message.

To support continuous availability, high-use networks, such as backbones, employ redundant network elements. This allows a given "internal" network element to failure or be taken offline without taking down the entire network. However, in some instances, it is not possible or practicable to provide redundant network elements at network ingress and egress points (e.g., at the network border elements).

In response to a network element failing or being taken offline, the peer network elements automatically (in most cases) detect the element is no longer available. Accordingly, corresponding Hello messages are propagated throughout the network to indicate route segments that include the network element are no longer available. This requires an update in the routing tables of the network elements. Also, since the Hello messages are usually transmitted over the same links used for network traffic, a portion of the available network bandwidth is reduced by their use. As might be expected, the greater the redundancy and size of a network, the greater the number of Hello messages used to reflect the change in network configuration, increasing the amount of bandwidth consumed by this non-revenue traffic.

Additionally, the failure or removal of a network element creates a significant problem with respect to message/data delivery. During packet/cell routing, packets and cells are "temporarily stored" as they traverse each network element along a given route. Thus, if a network element goes down, all of the packets/cells that are currently stored on that element will be lost. This generally produces two results. For confirmed delivery protocols, such as TCP/IP, the sender will determine after a time-out period with no confirmation reply that the message was not received by the receiver, and resend the message. This consumes additional network bandwidth, and the delay may be aggravating to the recipient. Worse yet, under unconfirmed delivery protocols, such as UDP (User Datagram Protocol), data corresponding to the lost packets is irretrievably lost. For voice traffic, this situation will either create a gap in the telephone conversion, or drop the call completely.

The failure of a network element also causes packet routes to change (to avoid the failed element), typically loading the network elements employed for the alternate paths, adding delays to the packet delivery. For example, networks are often configured in view of anticipated network traffic patterns, resulting in (ideally) load balancing of the network elements. When one of these elements fails, the proximate elements have to now handle rerouted traffic in addition to the traffic load they were configured for. This produces bottlenecks that reduce the operational bandwidth of the network as a whole.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for providing high reliability in network elements employing distributed architectures are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
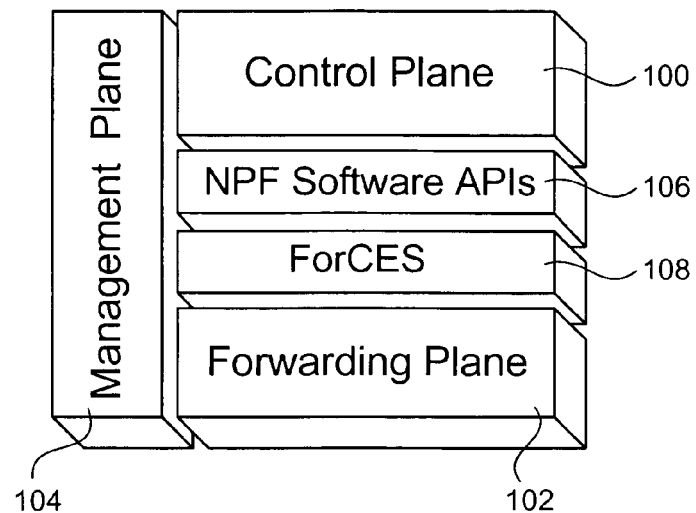
FIG. 1 is a block diagram illustrating a network architectural model with separated control and forwarding planes.

Network elements such as IP routers, Layer 3 switches, and 3G (third generation) RNCs (Radio Network Controllers) consist of three operational planes, namely, the control plane 100, the data/forwarding plane 102 and the management plane 104, as shown in FIG. 1. The control plane executes various signaling and other control protocols and configures the data/forwarding plane functions. The data or forwarding plane performs the wire-speed packet processing operations such as IP forwarding, classification, etc. Typically, the forwarding plane consists of special-purpose hardware (e.g., network processors) and may be written in associated microcode or other high-performance high-level software that performs per-packet operations at line rates. The control plane, in contrast, typically executes on a general-purpose processor, is often written in a high-level language such as C or C++, and modifies the behavior of data plane operations by configuring tables and parameters in the data plane. The management plane, which provides an administrative interface into the overall system, typically consists of both software executing on a general-purpose processor (including functionality such as a SNMP (Simple Network Management Protocol) daemon and a web server) as well as probes and counters in the hardware and microcode.

The management plane spans both the control and data/forwarding planes. For example, in an IP router, the control plane executes the control protocols such as OSPF, RIP, LDP, RSVP, etc. These control plane protocols exchange updates with their peers across the network and generate control information, e.g. routing tables, label tables, etc. needed by the data/forwarding plane to actually process (i.e. forward) data packets. The management plane provides a consistent external interface across the other planes for management purposes.

The separation between the control and forwarding planes is done by introducing open standardized programming APIs, e.g. those standardized by NPF (Network Processing Forum) (depicted as NPF Software APIs 106 in FIG. 1) and a protocol, namely the Internet Engineering Task Force's (IETF) Forward and Control Element Separation (ForCES) 108, between the control and data/forwarding planes.

Figure 2:
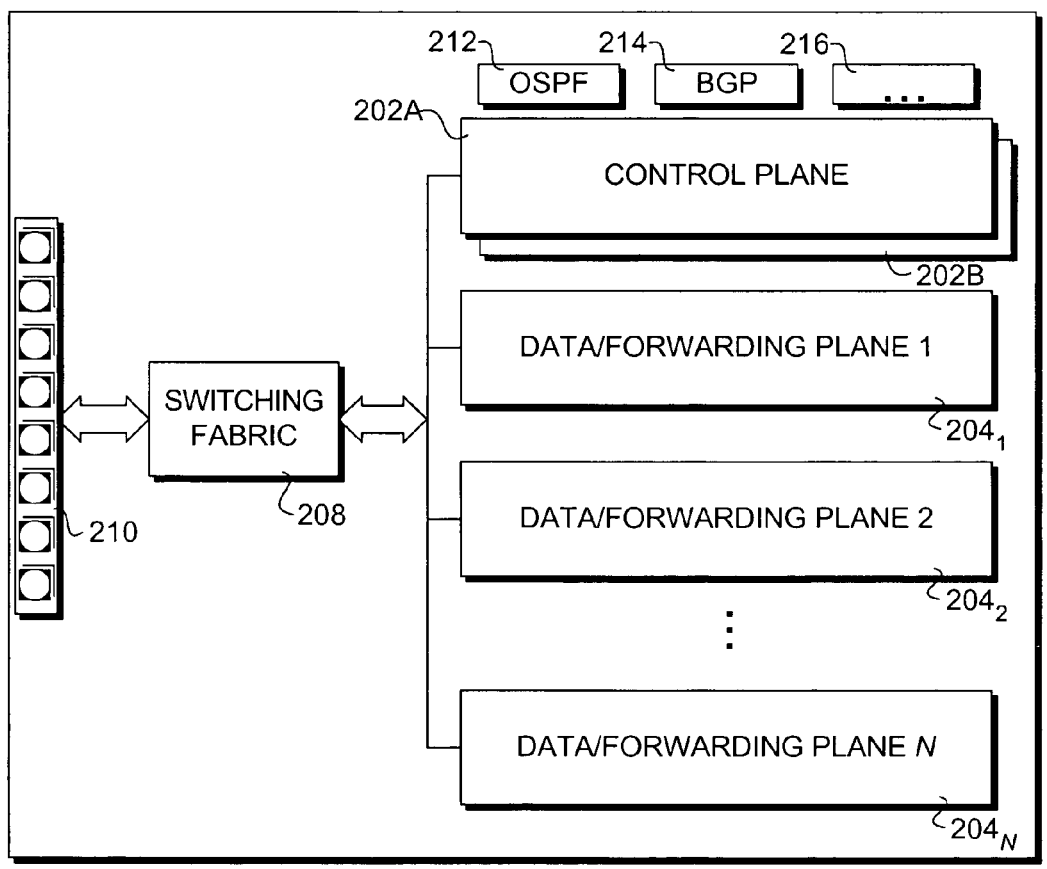
FIG. 2 is a schematic diagram illustrating an architecture for an exemplary network element that employs the network architectural model of FIG. 1.

FIG. 2 shows an architecture 200 that is typical for a class of network elements that are used for high reliability networks, such as telecommunications and high-speed data networks and backbones. The architecture includes one or more control plane cards (also referred to as boards or blades) 202 (depicted as a control (plane) card 202A and an optional control plane card 202B), and multiple data/forwarding plane line cards $204_{1-N}$. Generally, all the control plane processing is done in a centralized manner by the control plane card(s) while all media-specific processing and line-rate packet processing is done by the line cards.

The various control and line cards are interconnected via a backplane or mid-plane interconnect 206. Interconnect 206, is typically based on ATM, Ethernet, CSIX, or some proprietary switching fabric, and is used to transfer both control and data traffic between the cards. In some embodiments, interconnect 206 may employ one of many well-known standardized interconnect architectures, such as but not limited to Advanced Switching, Fibre Channel, Gigabit Ethernet, InfiniBand, RapidFabric, and StarFabric. In other embodiments, proprietary or future interconnect technologies may be employed. Interconnect 206 is connected to the network element's switching fabric 208, which, in turn, is coupled to the network element's various network ports 210. Under some embodiments, one or more separate cards or boards may be employed for the switching fabric operations. In other embodiments, the switching fabric operations are facilitated by interconnect 206 itself.

NPF APIs and IETF ForCES provide a standardized interface for components on the control card (control plane) to communicate with the components on the line cards (data/forwarding plane). This architecture has two key advantages; including 1) the processing resources of the control and data/forwarding planes are separated, allowing each to scale independently; and 2) components from different vendors can be used to build it.

In general, the control card(s) and data/forwarding plane line cards may be compliant with a standardized modular platform architecture, such as, for example, the Advanced Telecom Computer Architecture (ATCA) (also referred to as AdvancedTCA) or CompactPCI, or they may adhere to a proprietary standard, such as employed by vendors including Cisco, Broadcom, Nortel, 3Com, etc. In some embodiments, the control and line cards will comprise boards housed in a modular board chassis, such as an ATCA chassis or CompactPCI chassis. In other embodiments, the cards will comprise blades in a blade server chassis or the like.

Under a typical implementation, the control plane card(s) is/are responsible for one or more routing and/or signaling protocols, as are well-known in the art. Exemplary routing protocols depicted in architecture 200 include an Open Shortest Path First (OSPF) protocol 212 and a Boarder Gateway Protocol (BGP) protocol 214. As depicted by a block 216, other routing and signaling protocols may also be supported. The use of the OSPF and BGP protocols illustrated and discussed herein are merely exemplary of one of many routing and signaling protocols that may be handled by the control plane components.

As the load on the control plane routing and signaling protocols are run on a single resource, they are subject to scalability issues due to resource bottlenecks. In view of this, embodiments of the invention described herein employ a Distributed Control Plane (DCP) architecture, which enables seamless distribution of a control protocol across different processing elements to ease bottlenecks related to processing resources. For example, the OSPF Hello protocol processing takes up significant resources. Functions that are related to sending and receiving OSPF Hello messages over an interface can be distributed to the line card that contains the interface, because the OSPF Hello message processing is fairly contained. Thus, this aspect of the OSPF processing can be moved away (off-loaded) from the rest of OSPF processing so that the OSPF implementation will benefit in terms of scalability by such distribution.

The DCP architecture enables "functional distribution" in control protocols. It targets two types of control functions within a control protocol, namely 1) the parallelizable control functions, and 2) control functions that will benefit from execution on a particular processing resource (e.g. executing cryptographic control function on a processing resource with support for cryptographic acceleration). Functional distribution accelerates performance (compute and communication) bottlenecks of a control protocol by distributing them to "appropriate" processing resources in the system. Thus, the DCP architecture solves some of the scalability problems of the control protocols. These control protocols are also subject to failures from various faults in the network or hardware or software faults. In view of this and other considerations, an extended DCP (eDCP) architecture has been developed to provide a highly available network element.

Network elements are subject to hardware and software failures. These failures result in delays or loss of service, spoiling the user experience. When the time to recover from a fault is significantly larger than that allowed by the service, an interruption in the service results. Some short interruptions for a few seconds while surfing the Internet may be acceptable, but dropped calls while having a telephone conversation are not acceptable. A robust network element that can continue operation in spite of some failures is known as a highly available system. The embodiments described below include extensions to the DCP architecture that provide support for high availability, allowing distributed protocols to provide robust network element performance. The schemes include reusing existing redundant resources and reconfiguring these resources at runtime in the event of a fault.

Figure 3:
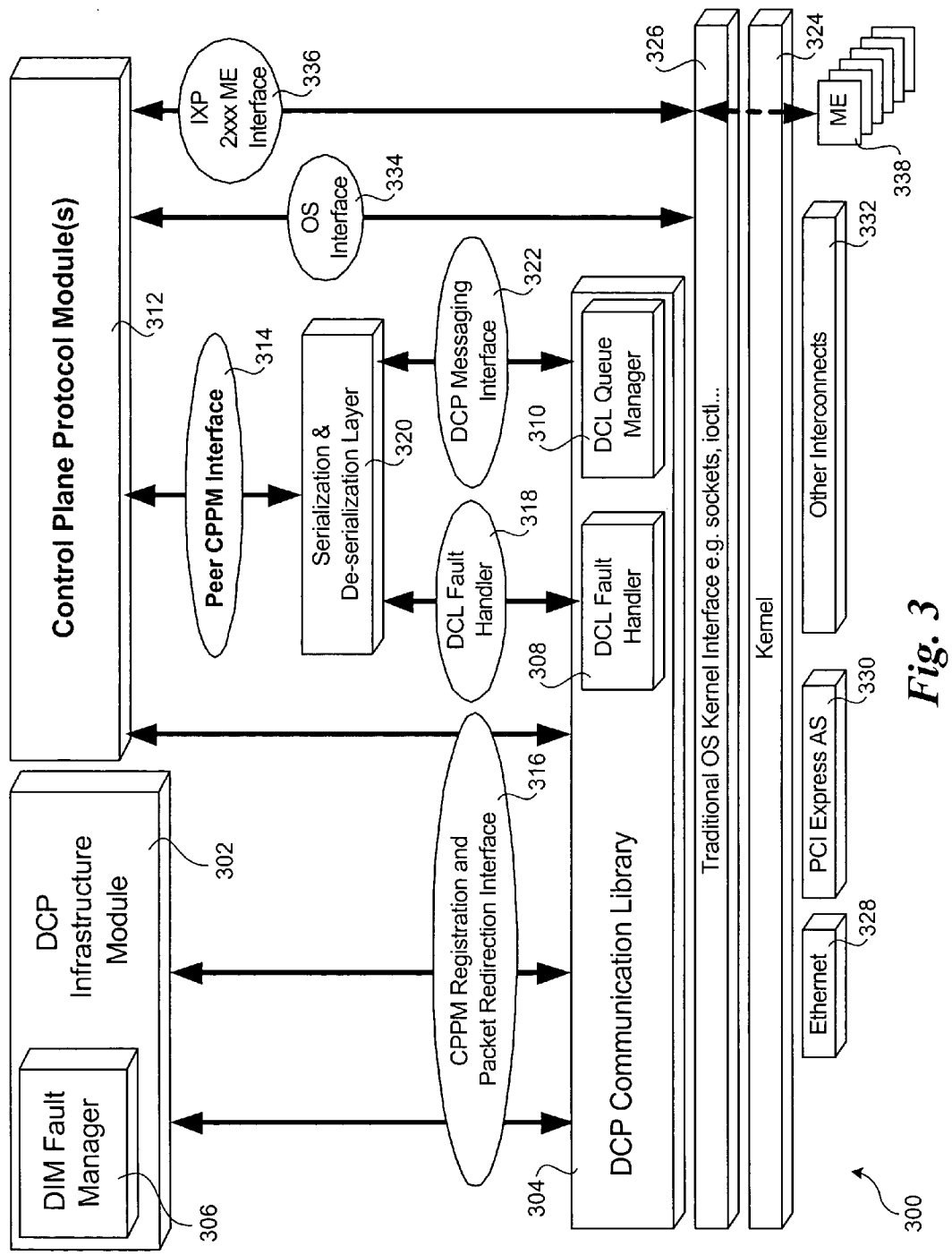
FIG. 3 is a schematic diagram of a software architecture used to support high availability in a network element, according to one embodiment of the invention.

FIG. 3 shows one embodiment of a software framework 300 to provide high availability in an extended DCP Architecture. The software framework provides mechanisms to transparently distribute the functionality of complex control plane protocols between different processing elements in network elements. The software framework also provides a scheme to handle software failures and hardware failures in the control and forwarding planes.

In one aspect, the eDCP architecture is independent of the control plane protocols and it takes advantage of programmable network processors, such as Intel's IXP® 2x000 network processors, and allows original equipment manufacturers (OEMs) to scale network elements without significant increase in the cost (both hardware and software) of the system. The mechanism adds value to this architecture by providing high availability and fault tolerance with minimum changes to the protocol software.

In one embodiment, the eDCP architecture may be implemented on a multi-processor hardware platform for the network element consisting of at least two processor levels: a) a control processor in a control card that would typically run the routing, signaling control protocols (e.g., perform control plane operations) and b) a programmable processor, e.g. a Network Processor on the line-cards or forwarding plane that performs the fast path packet processing/forwarding operations.

The eDCP Architecture shown in FIG. 3 comprises a distributed software architecture including generic components executing on both the control and line cards. The eDCP Architecture includes two major components: the DCP Infrastructure Module (DIM) 302 and the DCP Communication Library (DCL) 304. DIMs 302 executing on a control plane element include a DIM Fault Manager 306. The DCL 304 includes a Fault Handler 308 and a Queue Manager 310.

The software framework also employs the use of Control Plane Protocol Modules (CPPMs) 312. A CPPM corresponds to a protocol implementation that executes a single function or the complete functionality of a protocol as per an RFC (Request for Commend) or an industry standard. Multiple CPPMs work in conjunction to provide a complete implementation of the protocol via execution of corresponding software components across distributed processing resources. The protocol function that has been separated out of a core protocol implementation forms the Worker CPPM (W-CPPM) while the core functionality of the protocol is known as the Controller CPPM (C-CPPM). Each DCL instance is linked with a respective CPPM, and the DCLs are responsible for transparently providing communication between the CPPMs. The DCL communicates with the DIM to discover the peer CPPMs, and provides an abstraction of the peer CPPMs.

The eDCP Architecture 300 employs various interfaces for communication between the various software components. These include a CPPM Peer Interface 314, which is employed as the common interface between peer CPPMs. A CPPM Registration and Packet Redirection Interface 316 is employed for communication between DIMs, DCLs and CPPMs. A DCL Fault Handler interface 318 is used to facilitate communication between a DCL Fault Handler 308 and a Serialization and De-serialization layer 322, while a DCP Messaging interface 322 is used to facilitate communication between a DCL Queue Manager 310 and Serialization and De-serialization layer 322.

The eDCP architecture 300 also includes several conventional components, including an operating system (OS) Kernel 326 and an OS Kernel interface 328. One or more software components are used to facilitate interconnect messaging, as depicted by an Ethernet component 328, a PCI Express Advanced Switching (AS) component 330, and an "other interconnects" component 332.

The interfaces also include an OS interface 334, which is used to enable CPPMs 312 to communicate with OS kernel interface 326. Furthermore, an Intel IXP® 2xxx microengine (ME) interface 336 is used to facilitate communication between CPPMs 312 and microengines 338. Similar interfaces may be employed to facilitate communication between CPPMs 312 and other types of network processors The DCP Infrastructure module discovers and maintains connections between the Control Points. A Control Point (C-Pt) is defined as a control or forwarding plane hardware component executing a DIM along with one or multiple routing or signaling protocol functions (e.g., OSPF 212 and BGP 214). The DIM also keeps state information related to the CPPMs registered with its host C-Pt. When the CPPMs register or deregister, the event propagates to all other Control Points in the system. A CPPM that registers with the DIM may also register to receive events related to the peer CPPMs.

In one embodiment, DCP Communication Library 304 comprises a dynamic library that links with the protocol module to form the CPPM. The DCL communicates with the DIM using an IPC (Internal Procedure Call) mechanism to discover peer CPPMs and set up appropriate connections to them. After the DCL has set up a connection to the peer CPPMs, the protocol module can communicate with other peer CPPMs. The DCL serializes messages to the peer CPPM and de-serializes messages received from the peer CPPM via Serialization and De-serialization layer 322

The DIM is extended to handle hardware and software faults from the framework. The DIM Fault manager 306 is responsible for propagating faults related to the CPPM to other C-Pts and CPPMs. It is also responsible for reconfiguring the system depending on the fault. For example, suppose two OSPF Hello offloads are running on the microengines of two different Intel IXP2400 network processors, an OSPF controller is running on a control point running an Intel Architecture (IA)-based general-purpose microprocessor, and one of the OSPF Hello offloads is in active mode while the other is in standby mode. If the active OSPF Hello offload went down, the standby OSPF Hello offload interfaces would have to take over the processing from the active OSPF offload. In response, the fault manager at the DIM running on the Control Plane reconfigures the forwarding planes such that packets tunneled from the forwarding plane to the control plane by the VIDD would be switched to the standby OSPF Hello Offload. In one embodiment, a policy manager is employed to decide if and when the standby CPPM should take over the operation of the active CPPM. The DIM on the forwarding plane sends an appropriate event to the DCL of the standby CPPM, which in turn sets the standby OSPF Hello Offload in active mode. The standby protocol module thus takes over the resources owned by the active protocol module, as described below in further detail.

Hardware or software faults in the system result in events from the DIM to the DCL and events between the connected DCLs. The DCL Fault handler 308 is responsible for collapsing internal fault events and fault events received from the DIM into a single event to the CPPM. If the CPPM is running in standby mode, its DCL listens for changes in the active CPPM. If the active CPPM goes down, the fault handler in the standby DCL receives an event to that effect. The fault handler is agnostic to the protocol run by the CPPM and is capable of handling different types of resources supported by the DCP architecture. The fault handler then sets itself in active mode, i.e. this allows it to send and receive messages, and then sends an event to the standby CPPM to switch to active mode.

The DCL Queue Manager 310 is used to store certain state information required by the CPPMs for resynchronization after a failure. Hardware or software faults in the system result in the CPPM not being available for a certain period of time. If a CPPM goes down and a standby CPPM is not (immediately) available, the state synchronization messages from the peer to the given CPPM are saved in a queue. When the CPPM becomes available again, the queued messages from the peer CPPM are sent to the CPPM. It is expected that the queued messages contain state information relating to various resources and are not sensitive to the order in which they are sent. If the queue fills up before the CPPM becomes available, the peer CPPM will exit.

The eDCP Architecture is configured to designate the operations supported by each DIM and CPPM component, the resources they own, and the state they start up in. The configuration of each of the components should be consistent with the overall scheme. A Configuration Module is employed to configure the components in a consistent manner. Under one embodiment, the configuration is performed using XML files and the consistency is manually maintained.

When Control Points come up, they discover and bind to other C-Pts in the system as per the specified configuration. The Control Points then set up bi-directional communication channels and exchange their capabilities and the capabilities of locally registered CPPMs. Depending on the communication environment of the system (e.g. capabilities of the interconnect between C-Pts), the communication channel could be a TCP connection or another kind with similar semantics. Through the lifetime of this connection, the communication channel between C-Pts exchanges keep-alive messages, so if one of the C-Pts were to go down, the peer C-Pt will detect the failure and generate an event to this effect, which would be propagated to all interested C-Pts and CPPMs.

Figure 4:
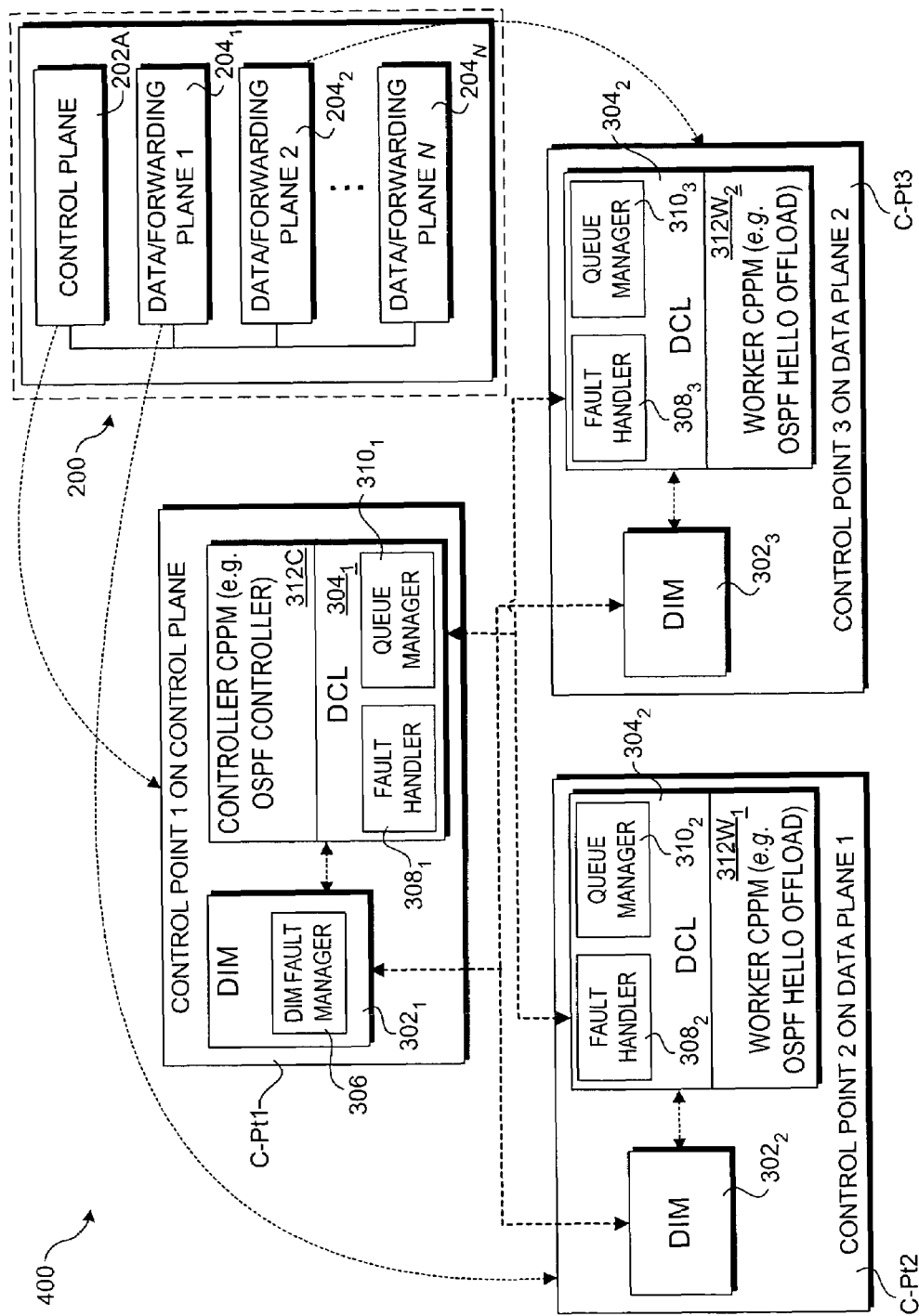
FIG. 4 is a schematic diagram of an exemplary network element architecture implementation of the software architecture of FIG. 3.

An exemplary eDCP architecture implementation 400 is shown in FIG. 4. The implementation includes a first Control Point C-Pt1 operating on control plane card 202A, a second Control Point C-Pt2 operating on data/forwarding plane line card 204, (corresponding to data plane 1), and a third Control Point C-Pt3 operating on data/forwarding plane line card $204_3$ (corresponding to data plane 2).

The software components operating on Control Point C-Pt1 include a DIM $302_1$, a DCL $304_1$, and a controller CPPM 312C. In the illustrated embodiment, controller CPPM is depicted as an exemplary OSPF controller. It is noted that controller CPPM 312C is representative of other types of routing and signaling protocols, as well. DIM $302_1$ includes a DIM Fault Manager 306. DCL $304_1$ includes a Fault Handler $308_1$ and a Queue Manager $310_1$.

The software components operating on Control Point C-Pt2 include a DIM $302_2$, a DCL $304_2$, and a Worker CPPM $312W_1$. In the illustrated embodiment, Worker CPPM $312W_1$ is depicted as an exemplary OSPF Hello offload component that works in conjunction with the OSPF controller running in the control plane (C-CPPM 312C). DCL $304_2$ includes a Fault Handler $300_2$ and a Queue Manager $310_2$. The software components operating on Control Point C-Pt3 are configured in a similar manner to those on Control Point C-Pt2 and include a DIM $302_3$, a DCL $304_3$, and a Worker CPPM $312W_2$. DCL $304_3$ includes a Fault Handler $308_3$ and a Queue Manager $310_3$.

Each DIM maintains a current view of the network element, which entails keeping track of the capabilities and resources of other Control Points in the network element and the CPPMs running on each of them. As shown in FIG. 4, each Control Point has a DIM and a CPPM running on it. In one embodiment, the Control Points and the CPPMs are connected over the same interconnect (e.g., interconnect 106). In one embodiment, a redundant secondary CPPM may be operated on the control plane and data planes, and can be made active when there is a failure in the primary CPPM.

The software framework facilitates a mechanism that provides high availability for the DCP architecture by guarding against hardware failures and software failures of the control protocol. The main aspect of the fail-over mechanism includes:

1. Synchronization of state between the CPPMs;
2. Detection of failures; and
3. Reconfiguration of the System after a failure.

In accordance with the synchronization aspect of the fail-over mechanism, active and standby components periodically synchronize their states. This scheme keeps the active and standby implementations synchronized during the operation. As the two implementations run different code paths (in one embodiment), the chances they would fail simultaneously are significantly reduced, making this scheme more robust.

The synchronization can be done is multiple ways. If there are two protocol modules peering to be controller and worker, the active and standby worker components, implementing the same functionality, may set up the synchronization between themselves. Thus the active worker would send messages to the standby worker when it receives packets or when it receives a message from the controller. Another way to achieve the synchronization would be for the active worker protocol module to transmit its state to the controller and then the controller synchronizes the standby worker's state. Under a hybrid scheme, all messages between the controller and worker are sent to active and standby workers. Thus, state changes caused at the active worker in response to received packets are synchronized between the active and standby workers. The particular synchronization scheme is left to the implementation of the CPPM.

Fast Fail-Over in Forwarding Plane

Fast fail-over in the forwarding plane concerns automated handling of a hardware or software failure on forwarding plane elements/components, such as a data/forwarding plane line card or the like. The overall operation enables such a component to failure in a manner that is transparent to the network element's operations (as perceived from other network elements). In one embodiment, the entire forwarding plane fail-over mechanism operates in a manner that keeps data and state information corresponding to temporal packet-processing operations intact, thereby eliminating the occurrence of dropped packets associated with the failure of conventional network elements. Furthermore, the fail-over mechanism is transparent to the underlying protocol used for the control plane operations.

In order to prevent any loss of state information, the state information is replicated across multiple data planes. Accordingly, there still remains at least one copy of the state information throughout the fail-over process. The process involves the synchronization of states between multiple data plane control points. In one embodiment, one of the data plane control points is deemed the "active" control point, while one or more additional data plane control points function as "standby" control points. The synchronization of states between the active and standby data plane control points is handled via the DCL working in conjunction with the respective active and standby worker CPPMs operating on the control points. The active Worker CPPM is configured by the Controller CPPM. It updates its internal state depending on packets received on the wire or messages from the Controller CPPM. Every state change is sent to the standby Worker CPPM, which updates its state to be consistent with the state of the active Worker CPPM. The messages between the CPPMs use a reliable communication provided by the DCL via interconnect 106.

Under the following exemplary fail-over process, Worker CPPM $312W_1$ of Control Point C-Pt2 operates as the active worker control point, while Worker CPPM $312W_2$ of Control Point C-Pt2 operates as the standby worker control point. When active Worker CPPM $312W_1$ incurs a state change, the change is detected by DCL $304_2$ operating on Control Point C-Pt2. In response, information corresponding to the state change is passed from DCL $304_2$ to DCL $304_3$ operating on Control Point C-Pt3. Upon receiving the state change information, DCL $304_3$ updates the state information for standby Worker CPPM $312W_2$. In another embodiment (not shown), multiple data plane control points are employed for standby operations. In this instance, the active Worker CPPM state information is forwarded to the multiple control points in a similar manner to that described for Control Point C-Pt3.

As discussed above, a "keep-alive" message mechanism is used between the DIM and CPPM running on the different control points in order to detect any software failures in the CPPMs. Under the mechanism, keep-alive messages are periodically exchanged between the DIM and CPPM for each control point. The keep-alive message interval can be tuned to have very fast failure detection. When the active Worker CPPM $312W_1$ on Control Point C-Pt2 goes down because of a failure, the loss is detected by DIM $302_2$ on C-Pt2 via the keep-alive mechanism. In response, DIM $302_2$ propagates this loss of connection to C-Pt1's DIM $302_1$ and C-Pt3's DIM $302_3$.

There is another keep-alive mechanism between the DIMs in the system that is used to detect hardware failures or unavailability, such as the failure of a data/forwarding plane line card. For example, if there was a hardware failure on a control point or if a corresponding line card was pulled out of its chassis, this action would be detected by the loss of DIM-to-DIM keep-alive messages at the DIMs on the other (still functioning) control points, e.g., on Control Points C-Pt1 and C-Pt3 in the illustrated example. In response to either type of failure, the DIM reconfigures it's internal state and forwards this information to the DCL of its local CPPM(s). The DCL at the standby Worker CPPM and Controller CPPM may also discover the failure of the active Worker CPPM by the loss of connection with that module.

In response to the detected failure, the system is reconfigured such that it no longer employs the failed Control Point. There is also a system wide entity, the DIM fault manager 306, running on the Control Point with a controller CPPM (e.g., C-Pt1), which monitors the different faults in the system and keeps the DIM on that Control Point up-to-date with that information. The DIM fault manager is responsible for reconfiguring the C-Pt and the standby CPPM after any fault/failure in the active CPPM. The fault manager maintains a fault tree and performs the function of consolidating different faults that occur in the system and provides a coherent fault trigger that is representative of all the faults that occur in the system. Concurrently, the DCL Fault Handler at the standby Worker CPPM consolidates internal fault events from its DCL and fault events received from the DIM to change the mode of operation of its CPPM from standby to active.

Reconfiguration of the system resources used by the Worker CPPM, like memory or external interfaces, is done in a manner transparent to the Controller CPPM and L3 protocols running on peer network elements. For example, while running the OSPF Hello worker CPPM, when the active worker fails, the DIM Fault Manager reconfigures the interfaces of the standby forwarding element (e.g., data/forwarding plane 2) such that the standby Hello worker can restart operation with the appropriate system configuration.

Figure 5:
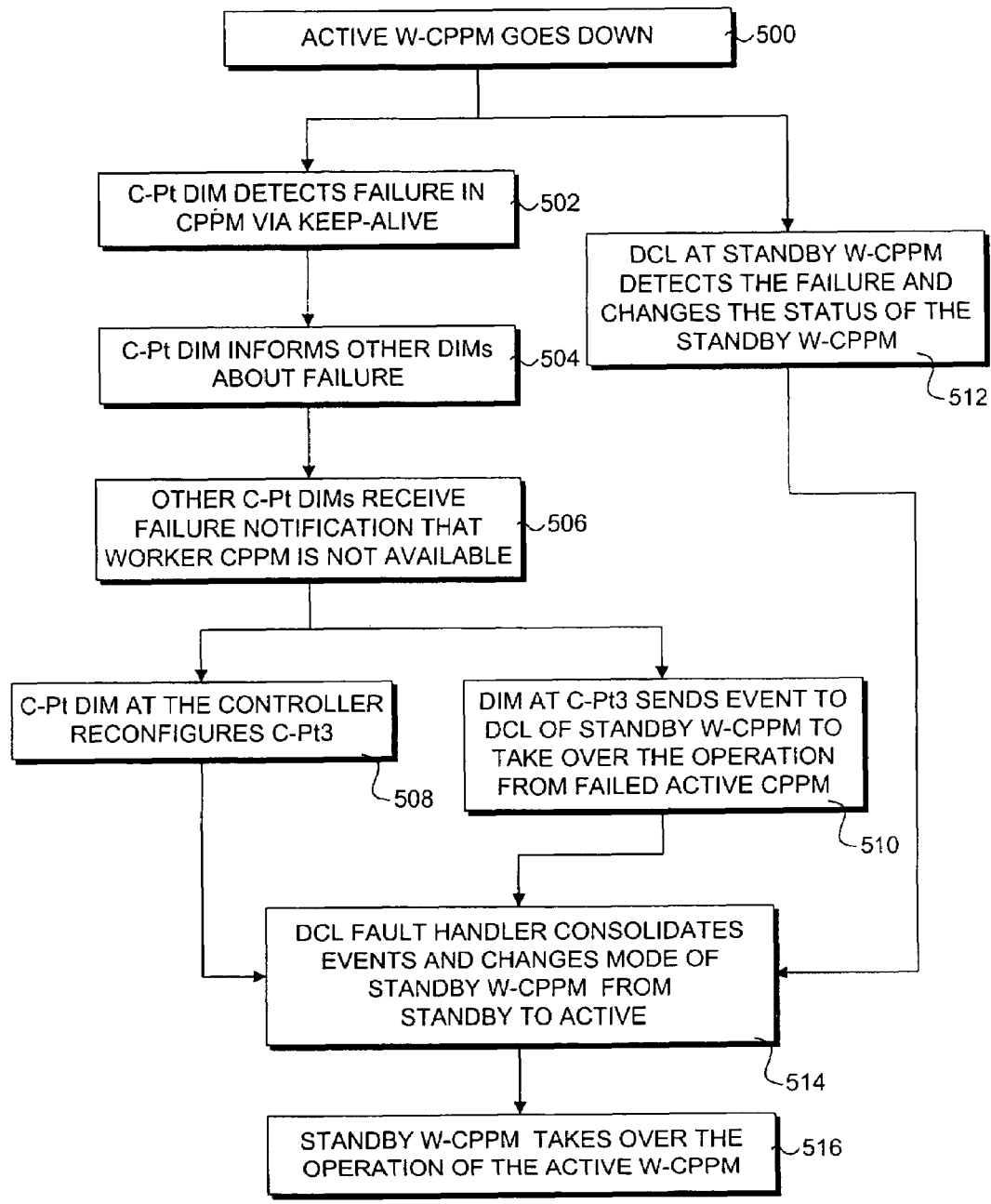
FIG. 5 is a flowchart illustrating operations performed during a fast fail-over in the data plane, according to one embodiment of the invention.

FIG. 5 shows a flowchart illustrating operations corresponding to one embodiment of a fast fail-over in the forwarding plane that is performed in response to a software failure in the forwarding plane. The fast fail-over process begins in a block 500, wherein the active Worker CPPM goes down (e.g., fails). In accordance with the proceeding example, the active Worker CPPM is Worker CPPM $312W_1$ operating on C-Pt2. In response, the failure or absence of Worker CPPM $312W_1$ is detected in a block 502 by DIM $302_2$ via the keep-alive messaging mechanism. For instance, a keep-alive callback message is not provided to DIM $302_2$ within a predefined timeout period.

As shown in a block 504, in response to detection of the failure, the DIM on the failed control point (e.g., DIM $302_2$ on C-Pt2) informs the other system DIMs (e.g., DIM $302_1$ on C-Pt1 and DIM $302_3$ on C-Pt3) about the failure via appropriate failure notifications. The failure notifications, which indicate that the failed Worker CPPM is no available, are received by the other Control Point DIMs in accordance with a block 506.

The particular handling of the failure notification depends on whether the Control Point receiving the failure notification is operating as a control plane or data plane element. As shown in a block 508, the DIM for the Control Point at the controller (C-Pt1) sends information via appropriate messages to reconfigure the standby Control Point (C-Pt3). In parallel (e.g., substantially at the same time), the DIM at Control Point C-Pt3 sends the event to the CDL of the standby W-CPPM $312W_2$ to take over operation from the failed active Worker CPPM.

As depicted by a block 512, the DCL ($304_4$) at the standby W-CPPM ($312W_2$) detects the failure and changes the status of the standby W-CCPM. This time, the failure detection is via the keep-alive messaging between the DCLs corresponding to the active and standby Worker CPPMs. For instance, under normal operation, keep-alive messages and corresponding callback messages are exchanged between the system's DCL's (e.g., DCL $304_1$, $304_2$, and $304_3$) on a periodic basis. Absence of a callback message over a predefined wait period indicates a CPPM failure.

Following the operations of blocks 508, 510, and 512, the logic of all three branches for these respective blocks proceeds to a block 514. In this block, the DCL Fault Handler consolidates the events and changes the mode of the standby W-CPPM from standby to active. The standby W-CPPM then takes over the operation of the active W-CPPM in a block 516.

Fast Restart in the Control Plane

Figure 6:
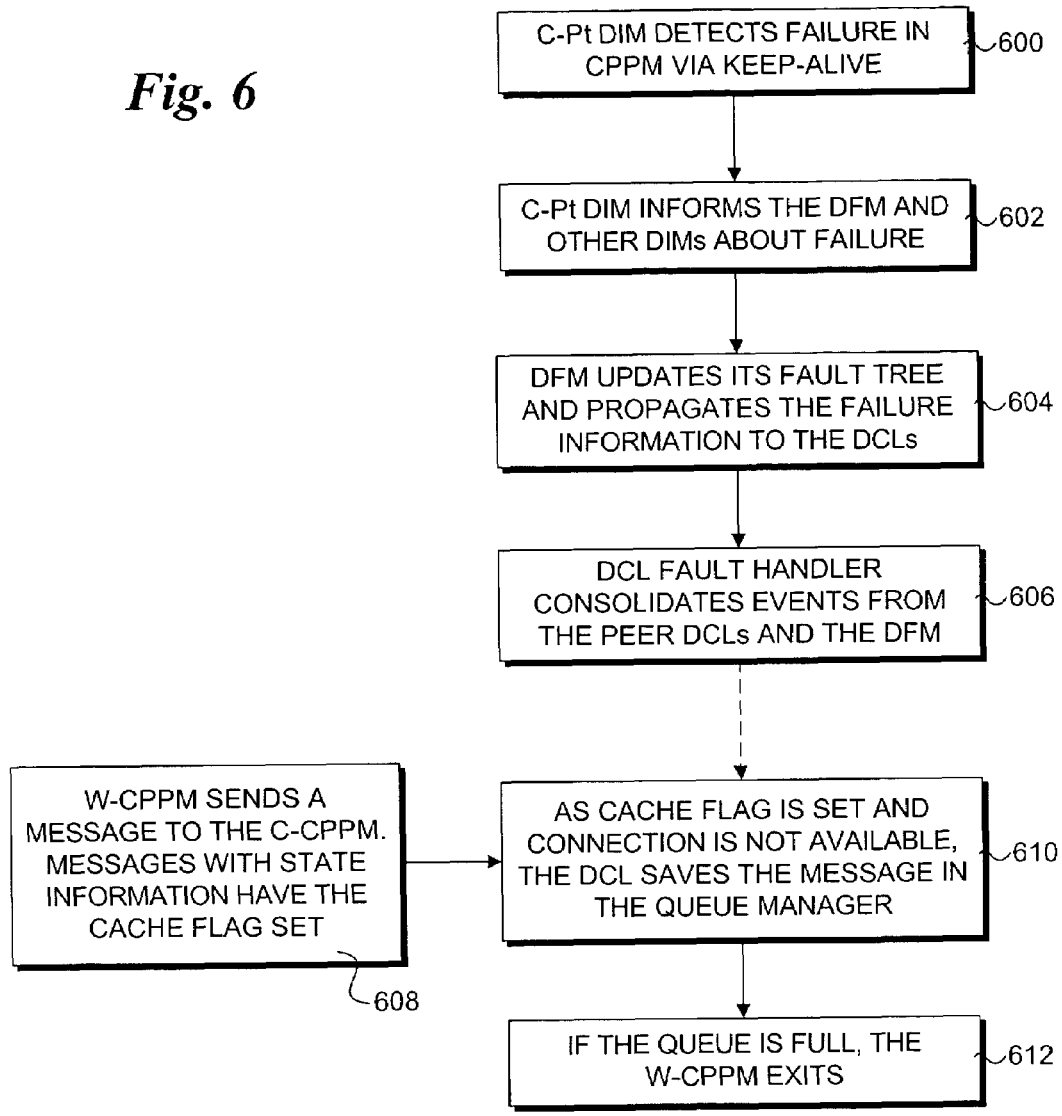
FIG. 6 is a flowchart illustrating operations performed to maintain state information during a failure in the data plane; according to one embodiment of the invention.
Figure 7:
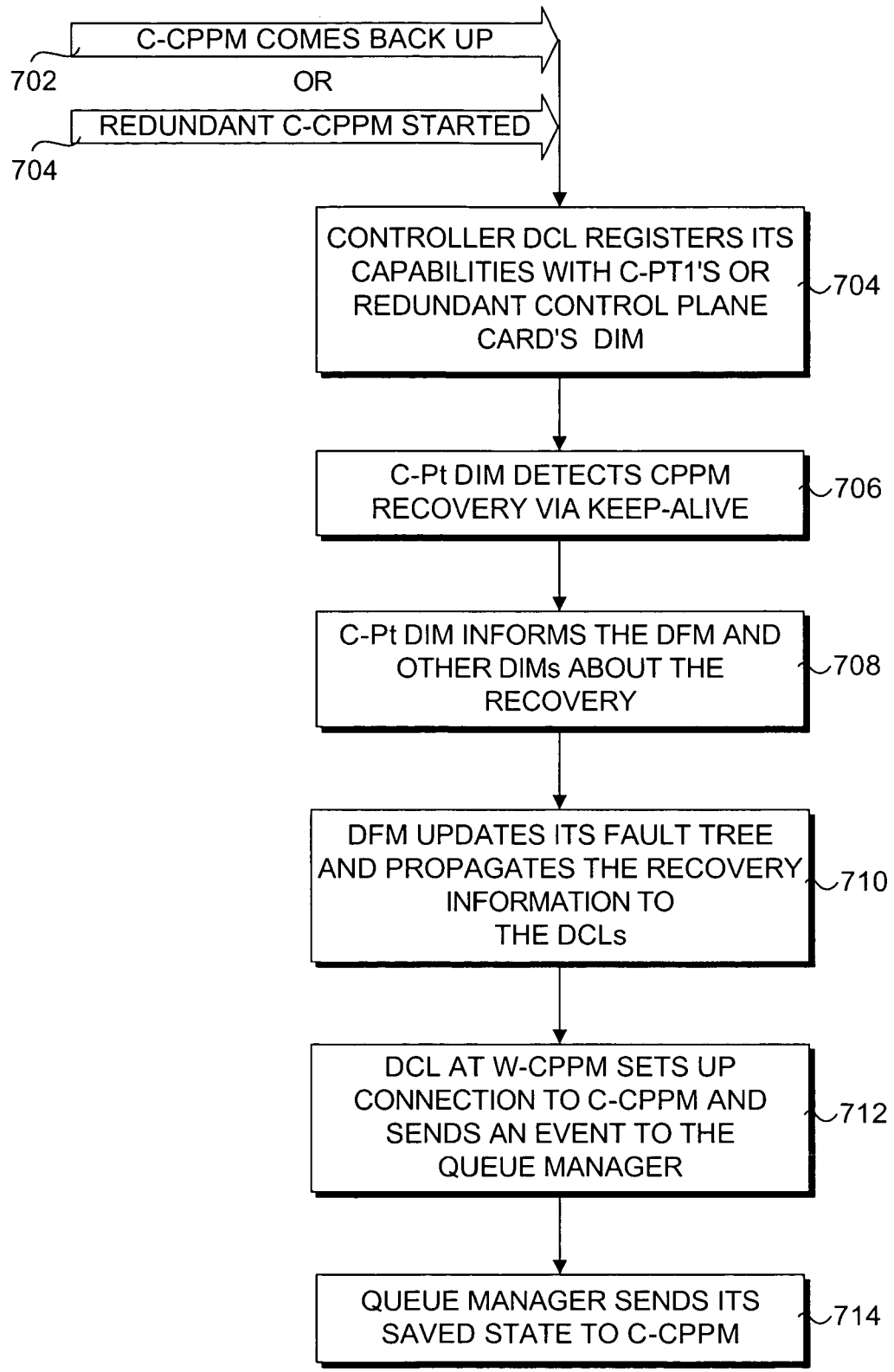
FIG. 7 is a flowchart illustrating operations performed during a fast restart in the control plane; according to one embodiment of the invention.

FIGS. 6 and 7 are flowcharts illustrating operation performed during a fast restart in the control plane in response to a failure in the controller CPPM. In a block 600, the DIM for the control point hosting the active Worker CPPM (e.g., Control Point C-Pt1) detects the failure in the Controller CPPM via the keep-alive messaging mechanism. The host control point informs the DIM Fault Manager (DFM) 306 and other DIMs (e.g. DIMs $302_2$ for C-Pt$_2$ and $302_3$ for C-Pt$_3$) about the failure in a block 602. The DFM then updates its fault tree and propagates the failure information to the DCLs of the data/forwarding plane line cards (e.g., DCL $304_2$ and DCL $304_3$) in a block 604. In one embodiment, the DIM of the controller CPPM propagates the loss of its connection to its CPPM to the active Worker CPPM on a corresponding line card. In a block 606, the DCL Fault Handler for the active Worker CPPM consolidates the events from the peer DCLs and the DFM.

While the Controller CPPM is down, the state information may change. This is managed by the active Worker CPPM. In a block 608, the Worker-CPPM attempts to send a message to the Controller CPPM. In one embodiment, messages sent to the Controller CPPM from a Worker CPPM employ a cache flag that is used to indicate how the message should be handled. Under normal operating conditions (e.g., the C-CPPM is up), information is returned to the active Worker CPPM indicating its message has been received. In this case, however, the message cannot be received, and thus information regarding the message contents needs to be stored so that it can be provided at a later point in time. In one embodiment, the cache flag is used to denote whether messages should be queued when the Controller CPPM is not available. As shown in a block 610, the DCL on the data/forwarding plane card hosting the active Worker CPPM saves the message in its queue manager when the cache flag is set. Under the example of FIG. 4, this would involve DCL $304_2$ and queue manager $310_2$.

In one embodiment, the queued messages are consolidated final state messages, where the latest message contains the complete state information. Thus, if a certain message already exists in the queue, it is overwritten by the latest message of that type. This scheme prevents the peer CPPM from getting confused by multiple states from the CPPM and is optimized for the best use of the queue in view of potential size restrictions. The scheme also allows the Worker CPPM to continue operation during a short shutdown due to a failure or while the Controller software is being upgraded. As shown in a block 612, once the queue is full, the Worker CPPM exits. Thus, the queue size should be determined such that there is a reasonable amount of time for the controller CPPM to recover and be configured at initialization prior to the queue becoming full.

With reference to FIG. 7, when the controller CPPM comes back up or a redundant controller CPPM is started (as depicted by event arrows 700 and 702), the controller's DCL will register its capabilities with the controller CPPM's DIM, as depicted in a block 704. Also in response to the returned availability of the Controller CPPM, the Control Point DIM detects CPPM recovery via the keep alive messaging mechansims, and the Control Point DIM informs the DFM and other DIMs about the recovery, as shown in blocks 706 and 708. The DFM then updates its fault tree and propagates the recovery information to the DCLs in a block 710.

During normal ongoing operations, the Controller CPPM is responsible for periodically saving part of its state not related with the Worker CPPM in some local storage means, such as a file stored on a local disk or in a persistent memory store. This allows the C-CPPM to recover its last state after a failure, when it comes back on the same Control Point. In connection with this operational aspect, the DCL at the active Worker CPPM (e.g., DCL $304_2$) sets up a connection with the Controller CPPM and sends an event to its queue manager (e.g., queue manager $310_2$) in a block 712. The queue manager then sends its queued saved state information (e.g., one or more queued messages, as applicable).

Fast Fail-Over in Control Plane

Fast fail-over in the control plane concerns automated handling of a software and/or hardware in a control plane component. For example, the software comprising an active Controller CPPM may fail. Optionally, a failure of a processor component, memory, etc. from an active control plane card or the removal of the card from a system chassis could produce a similar situation.

Figure 8:
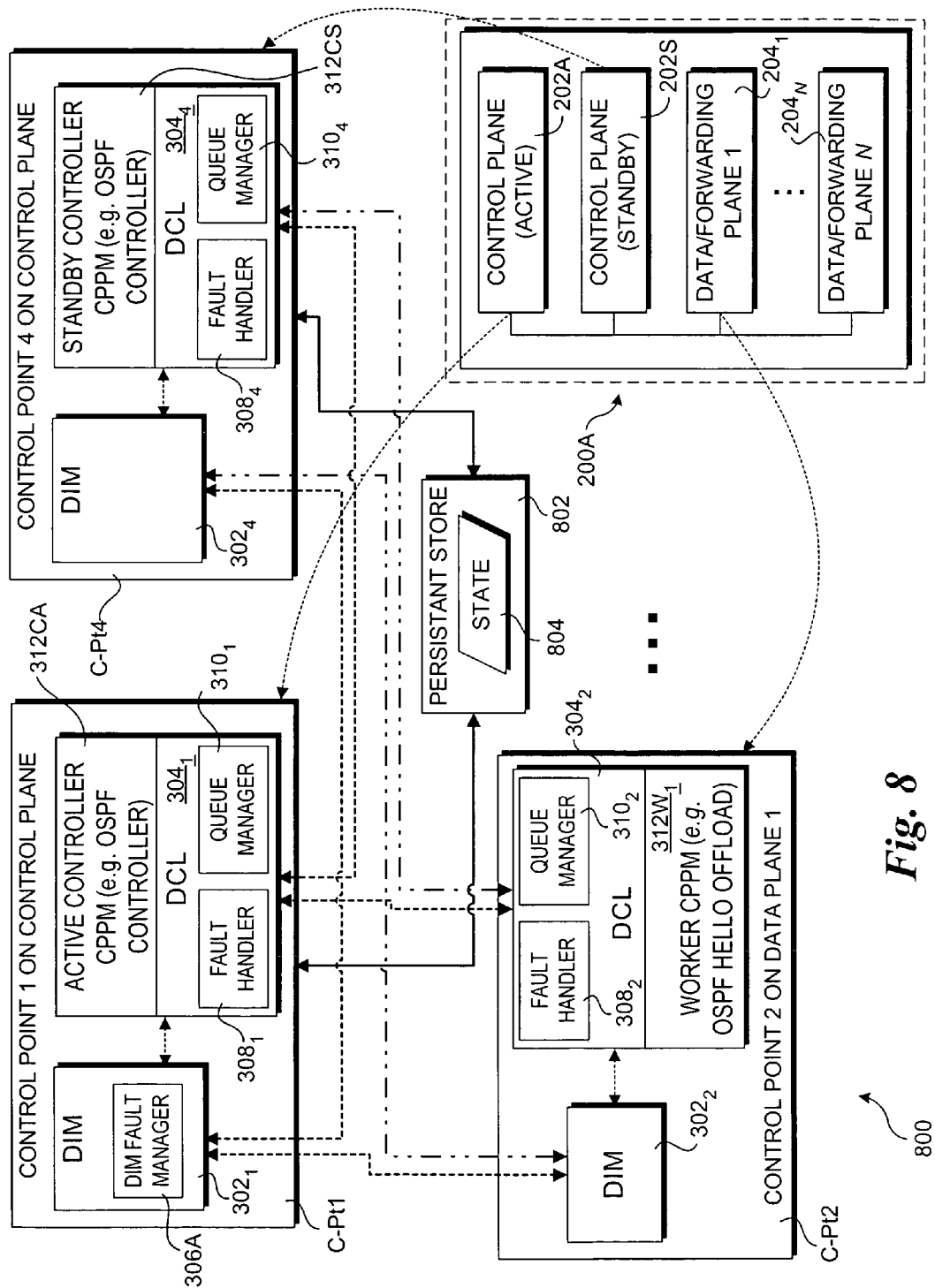
FIG. 8 is schematic diagram of an exemplary network element architecture implementation that supports fast fail-over in the control plane via use of active and standby control cards.
Figure 9A:
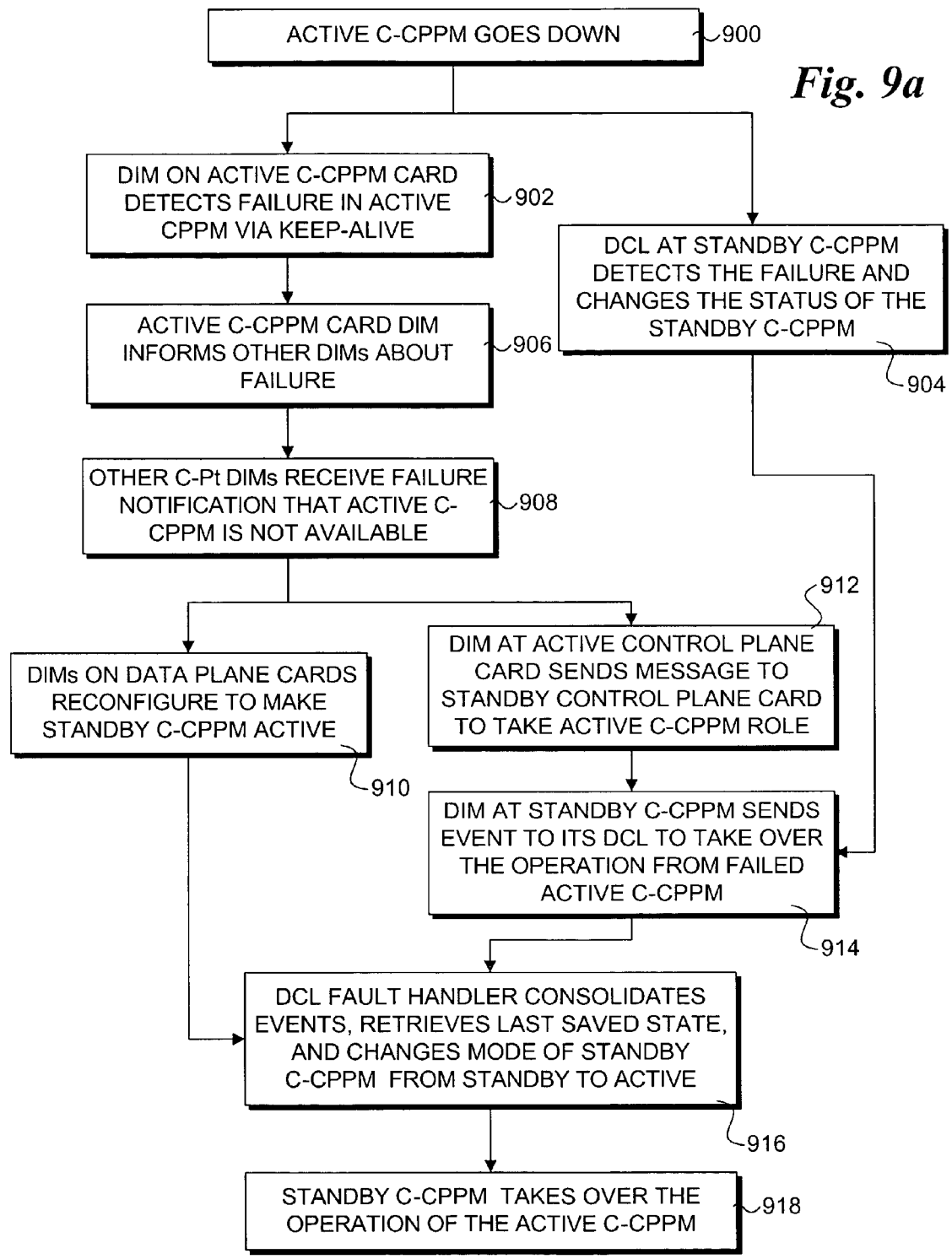
FIG. 9a is a flowchart illustrating operations performed during a fast fail-over in the control plane in response to a software failure; according to one embodiment of the invention.
Figure 9B:
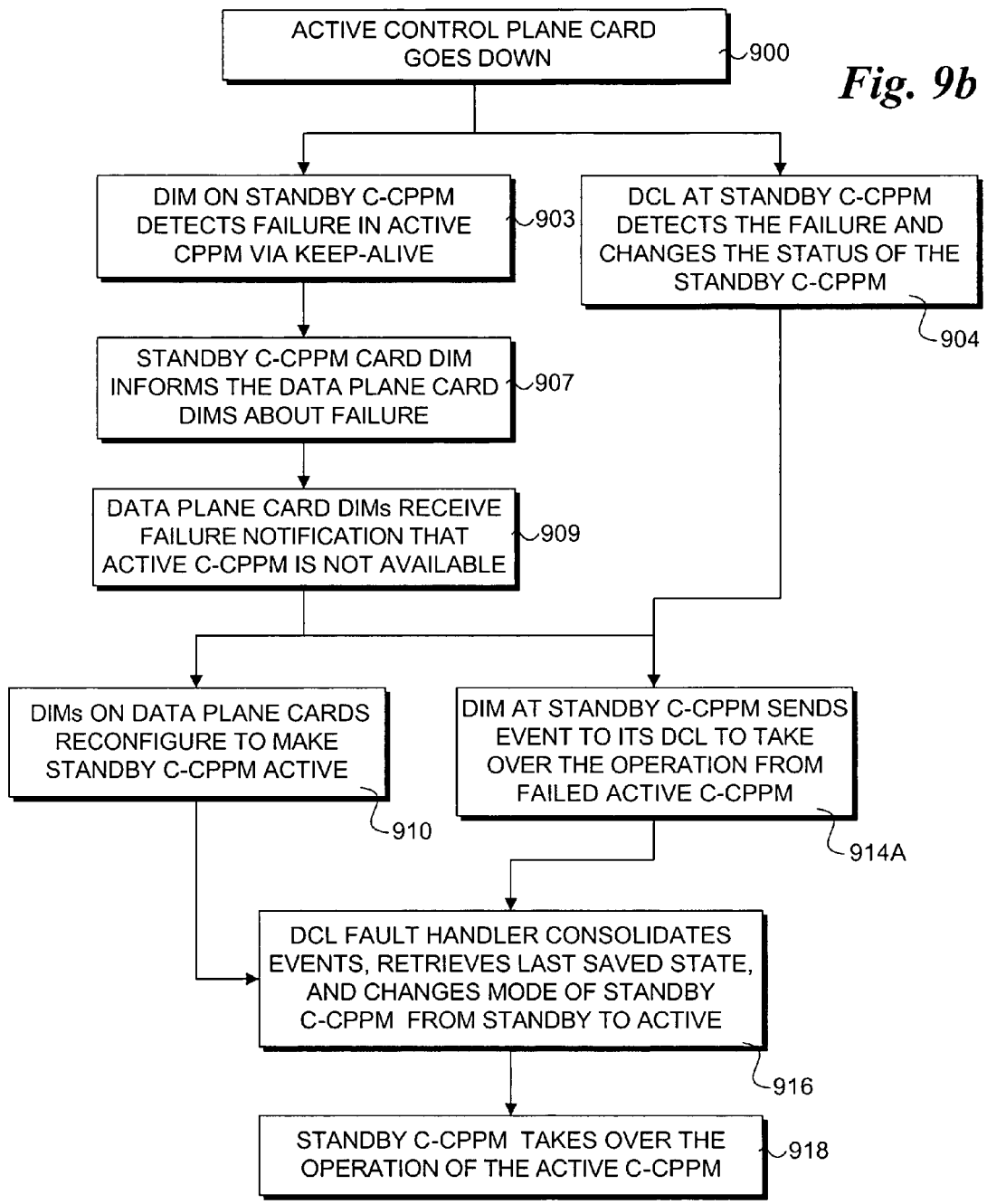
FIG. 9b is a flowchart illustrating operations performed during a fast fail-over in the control plane in response to a hardware failure; according to one embodiment of the invention.

FIG. 8 shows an eDCP architecture implementation 800 used to illustrate one embodiment for performing fast fail-over in the control plane in conjunction with the flowcharts of FIGS. 9a and 9b. The architecture includes components analogous to the components of eDCP architecture implementation 400 shown in FIG. 4 and discussed above. However, in this instance the control plane operations are facilitated by two control plane cards rather than the single card implementation shown in FIG. 4. As illustrated by hardware configuration 200A, the control plane cards include an "active" control plane card 202A and a "standby" control plane card 202S having similar configurations to the control plane card 202A discussed above. The control plane and data/forwarding cards are used to perform the operations of respective Control Points. Control Point C-Pt1 is used to host the active Controller CPPM 312CA, while a new Control Point C-Pt4 is used to host a standby Controller CPPM 312CS. Control Point C-Pt1 hosts a DIM $302_1$ including a DIM Fault Manager 306A, while Control Point C-Pt4 hosts a DIM $302_4$. The configuration of Control Point C-Pt2 is similar to that shown in FIG. 4 and discussed above. For the purpose of clarity, the other data/forwarding elements (e.g., cards 2-N) are not shown.

As before, the DIMs on each of the Control Points are enabled to communicate with each other via corresponding messages. Similarly, the DCLs on each of the Control Points communicate with each other via corresponding messages. Also, as before, the DIM and the DCL for a given Control Point communicate with each other. As depicted by the short dashed lines in FIG. 8, the DIM and DCL of a data/forwarding plane Control Point (e.g., C-Pt2) normally communicate with the DIM and DCL for the Control Point hosting the active Controller CPPM. The phantom lines represent communication between the DIMs and DCLs of a data/forwarding plane Control Point and the Control Point hosting a standby Controller CPPM after the standby C-CPPM has been switched to the active C-CPPM, as described below.

Also shown in FIG. 8 is a persistent store 802 and state data 804. As discussed above, the DCL for the Controller CPPM periodically stores state information in a persistent store, thus enabling the same state information to be retrieved at a subsequent point in time. This state information is depicted by state data 804. As depicted in the illustrated embodiment of FIG. 8, both the Control Points hosting Controller CPPMs have access to persistent store 802 and state data 804. It is also possible for the DCL to communicate this data directly to the standby Controller CPPM, without going through the persistent memory store.

FIG. 9a shows a flowchart illustrating operations performed in response to a software failure involving an active Controller CPPM. Overall, the process is roughly analogous to the fast fail-over in the data plane process shown in FIG. 5 and discussed above. The process begins with an active C-CPPM going down in a block 900. In a block 902, the DIM on the active C-CPPM card (e.g., C-Pt1 in this example) detects the failure has occurred via the keep-alive messaging mechanism. Meanwhile, the DCL at the standby C-CPPM Control Point (e.g. DCL $304_4$) detects the failure via the DCL keep-alive messaging mechanism and changes the status of the standby C-CPPM.

Returning to the left-hand flow, the active C-CPPM card DIM informs the other DIMs about the failure in a block 906, with the other Dims receiving a failure notification indicating the active C-CPPM is not available in a block 908. In a block 910, the DIMs on the data plane cards are reconfigured to make the standby C-CPPM the active C-CPPM. In parallel, the DIM at the active control plane card sends a message to the DIM on the standby control plane card to take over the active C-CPPM role. In response, the DIM at the standby C-CPPM card sends an event to its DCL to take over the operation from the failed active C-CPPM.

In a block 916, the DCL fault handler consolidates the events. For example, this might include obtaining queue messages from the queue managers of the data plane Control Points. This also includes retrieving the state data 804 from persistent store 804. These data are used to initialize the state on the new active C-CPPM with the state of the previous active C-CPPM at the time it failed. Upon completion, the mode of the standby C-CPPM is changed from standby to active. The standby C-CPPM then takes over the operation of the active C-CPPM in a block 918.

FIG. 9b shows operations performed during a fast fail-over in the control plane due to a Control Point failure. For instance, in accordance with the present example, there is a hardware failure on C-Pt1 or a removal of the corresponding control plane card. The operations shown in like-numbered blocks in both of FIGS. 9a and 9b are similar under both embodiments. Accordingly, the following discussion primarily concerns the difference between the two schemes.

The fast fail-over in the control plane process of FIG. 9b begins in a block 901, wherein an active control plane goes down. Since the card is down (e.g., either not functioning or removed entirely), the DIM on the card is not available. Accordingly, the failure must be detected by another component.

Under one embodiment, detection of a control plane card failure is performed by the standby control plane card. Under an optional scheme, one or more of the data/forwarding plane cards may by employed to serve this purpose. In accordance with the operations of a block 903, the DIM on the standby C-CPPM card detects the failure of the active C-CPPM card via a keep-alive messaging mechanism. As in FIG. 9a, the failure may also be detected via the DCL keep-alive messaging mechanism employed by the control plane cards. In response to determining a failure exists, the DIM on the standby card informs the data plane cards DIMs about the failure, with corresponding notifications being received in a block 909.

The operations of block 914a, 916, and 918 are substantially the same as described above for blocks 914, 916, and 918 in FIG. 9a. However, under the scheme of FIG. 9b, the active C-CPPM take-over initiation operation of block 912 is not available due to the absence of a functional DIM on the failed active C-CPPM card. Accordingly, the operation of block 914A is self-initiated by the standby controller card.

Figure 10:
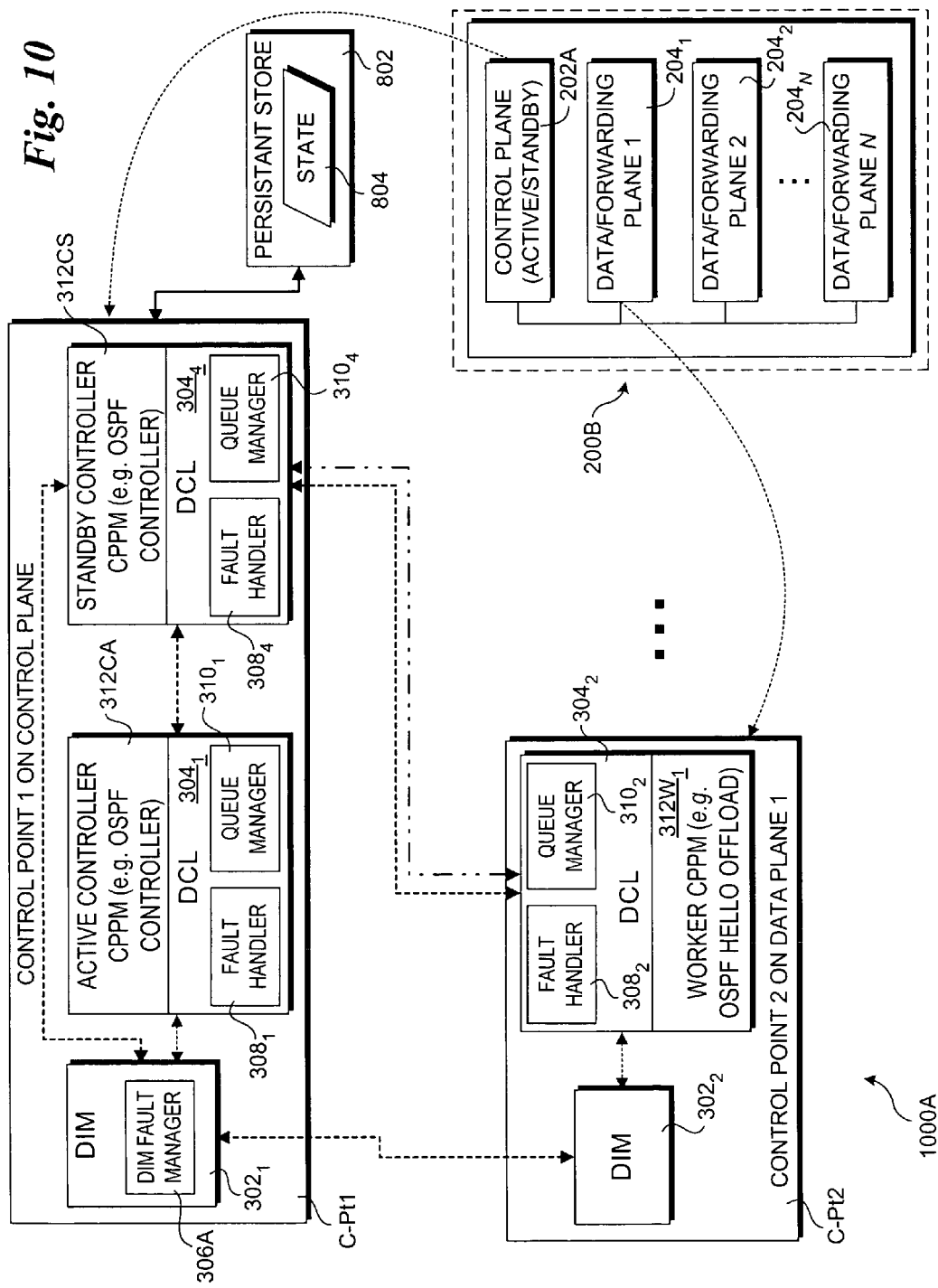
FIG. 10 is a schematic diagram illustrating an alternate configuration to that shown in FIG. 8, wherein a single control card employs an active and standby set of software components.

In addition to having control plane software components distributed across multiple control plane cards, similar components may be distributed across a single card. For example, an exemplary architecture configuration 1000A is shown in FIG. 10. Under architecture configuration 1000A, a control plane card corresponding to Control Point C-Pt1 hosts an active Controller CPPM 312CA and a standby Controller CPPM 312CS. Each of these components is in communication with one another other, as well as in communication with a single DIM $302_1$. The corresponding network element hardware configuration is depicted by architecture implementation 200B.

In general, fast fail-over Control Plane operations for architecture configuration 1000B are similar to those performed under the fast fail-over Control Plane flowchart of FIG. 9a. The fast fail-over Control Plane operations for architecture configuration 1000A are slightly different, with the bulk of the operations being handled by DIM fault manager 306A. Under some embodiments, the failure of an active Controller CPPM under either of architecture configurations 1000A or 1000B are handled in a manner that is transparent to the data/forwarding plane cards, such that there is no configuration changes are required. This is handled, in part, by a software abstraction that provides a virtual address and/or alias for the various software components.

Exemplary System Implementation

Figure 11:
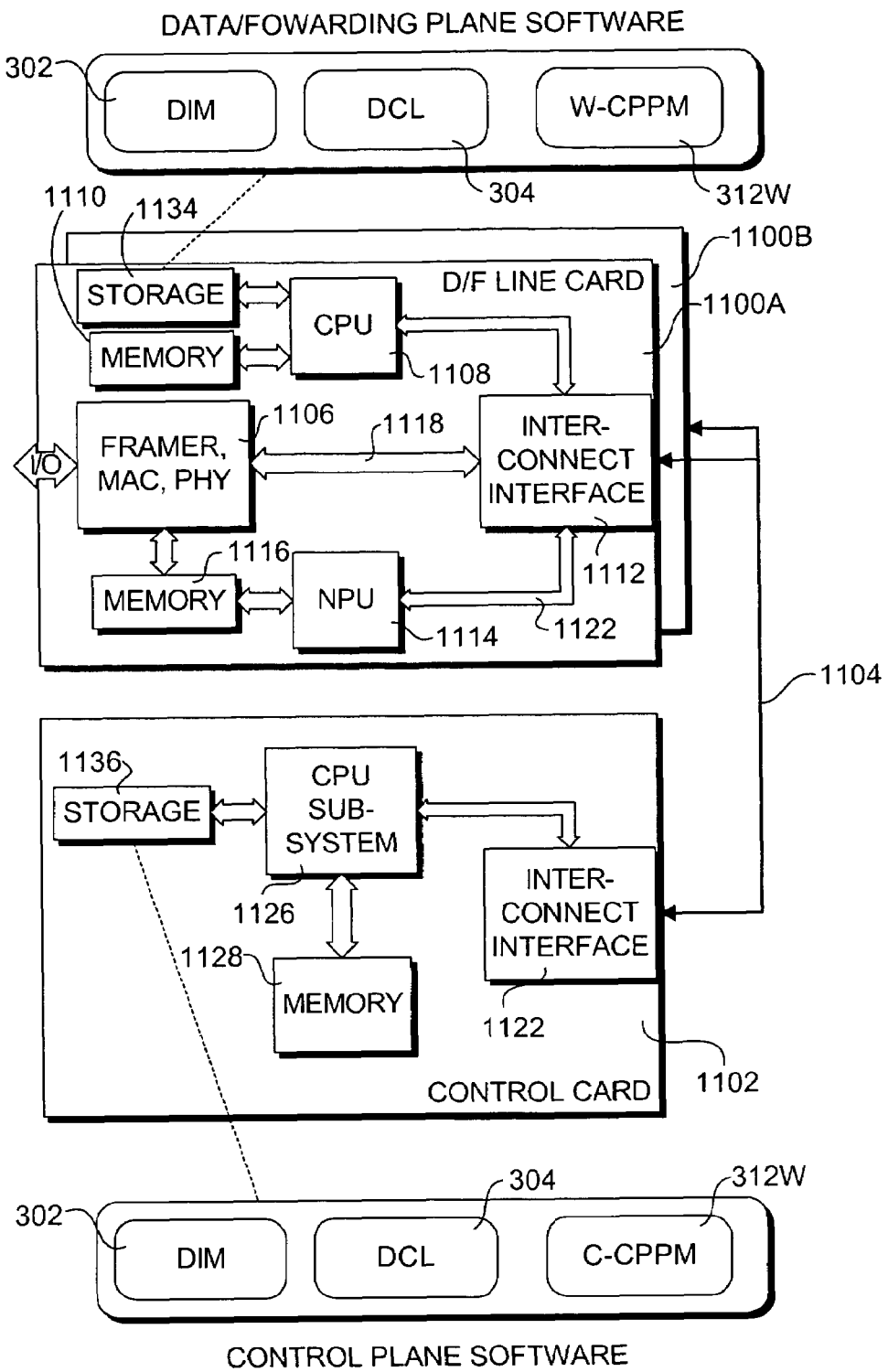
FIG. 11 is a schematic diagram illustrating an exemplary hardware architecture suitable for practicing aspects of the embodiments described herein.

An exemplary systems implementation that may be employed for practicing aspects of the embodiments described herein is shown in FIG. 11. Exemplary boards employed in the implementation include a pair of data/forwarding line cards 1100A and 1100B, and a control card 1102, which are linked in communication via an interconnect 1104.

Each of data/forwarding line cards 1100A and 1100B include a framer, media access channel (MAC) component, and physical layer (PHY) component, collectively depicted as a component 1106 for convenience. The line cards further include a central processing unit (CPU) 1108, coupled to memory 1110 and an interconnect interface 1112, and a network processing unit (NPU) 1114, coupled to memory 1116 and interconnect interface 1112.

Control card 1502 is used to perform control plane operations corresponding to the embodiments discussed above, and includes a CPU sub-system 1126 and memory 1128. In one embodiment, CPU sub-system 1126 includes a single general-purpose processor, such as, but not limited to, an Intel Architecture (IA) general-purpose processor. In another embodiment, CPU sub-system 1126 includes multiple general-purpose processors.

Each of data/forwarding line cards 1100A and 1100B functions as a data/forwarding plane Control Point. Thus, the software components for a data/forwarding plane Control Point, comprising an instance of DIM component 302, DCL component 304, and a Worker CPPM component 306, are loaded into memory 1110 and executed on CPU 1108 (in conjunction with an operating system running on CPU 1108). The data/forwarding plane software components may be stored on a given line card using a persistent storage device, such as but not limited to a disk drive, a read-only memory, or a non-volatile memory (e.g., flash device), which are collectively depicted as storage 1134. Optionally, one or more of the software components may comprise a carrier wave that is loaded into memory 1110 via a network.

Control card 1204 is used to function as a control plane Control Point. Thus, the Control Plane software components including an instance of DIM component 302, DCL component 304, and a Worker CPPM component 306W, are loaded into memory 1128. In a manner analogous to the line cards, in one embodiment, the Control Plane software components software components are stored in a persistent storage device, depicted as storage 1136. In another embodiment, one or more of the PFM device software components are loaded into memory 1128 via a network.

Furthermore, the code (e.g., instructions) and data that are executed to perform the DIM, DCL, and CPPM operations described above comprise software components executed upon some form of processing core (such as the CPU) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
    configuring a network element to include multiple sets of redundant control plane components, each redundant set including an active component and a standby component;
    monitoring for a failure of an active control plane software component comprising a control plane protocol module running on a control plane card ("controller CPPM") to perform a routing or switching protocol operation, the controller CPPM to work in conjunction with a control plane protocol module implemented on a data plane element ("worker CCPM") to facilitate operation of the routing or switching protocol operation;
    automatically reconfiguring the network element to employ a corresponding standby controller CPPM in place of the active controller CPPM during failure;
    maintaining state change information that occurs at the worker CPPM while the controller CPPM is unavailable;
    queuing messages including the state change information, wherein the worker CPPM determines which messages are to be queued; and
    providing the queued messages to the controller CPPM.

2. The method of claim 1, wherein the controller CPPM and the worker CPPM comprise software components that work in conjunction to provide a substantially complete implementation of the routing or switching protocol operation.

3. The method of claim 1, wherein the controller CPPM performs a core protocol implementation and the worker CPPM performs a protocol function that has been separated out of the core protocol implementation.

4. The method of claim 3, further comprising
    providing the state change information that occurred while the controller CPPM was unavailable to a replacement controller CPPM when the controller CPPM returns to operation.

5. The method of claim 4, wherein the controller CPPM and worker controller CPPM perform operations in accordance with at least one of the Open Shortest Path First (OSPF) and Border Gateway Protocol (BGP) routing protocols.

6. The method of claim 1, wherein the method performs a fast fail-over process in the control plane that is performed in a manner that is transparent to other network elements to which the network element is coupled in a network.

7. The method of claim 1, wherein failure of the control plane component is detected using a keep-alive messaging mechanism that employs an exchange of keep-alive and callback messages between software components running on one of:
    a) separate control plane cards;
    b) a common control plane cards; and
    c) a control plane card hosting the software component that has failed and a data/forwarding plane card in the network element.

8. A computer storage medium having stored thereon computer executable instructions to execute in a network element, which, when executed perform operations including:
    configuring a network element to include multiple sets of redundant control plane components, each redundant set including an active component and a standby component;

monitoring for a failure of an active control plane software component comprising a control plane protocol module running on a control plane card ("controller CPPM") to perform a routing or switching protocol operation, the controller CPPM to work in conjunction with a control plane protocol module implemented on a data plane element ("worker CCPM") to facilitate operation of the routing or switching protocol operation;

automatically reconfiguring the network element to employ a corresponding standby controller CPPM in place of the active controller CPPM during failure;

maintaining state change information that occurs at the worker CPPM while the controller CPPM is unavailable;

queuing messages including the state change information, wherein the worker CPPM determines which messages are to be queued; and providing the queued messages to the controller CPPM.

9. The computer storage medium of claim 8, wherein the controller CPPM and the worker CPPM comprise software components that work in conjunction to provide a substantially complete implementation of a protocol.

10. The computer storage medium of claim 8, wherein the controller CPPM performs a core protocol implementation and the worker CPPM performs a protocol function that has been separated out of the core protocol implementation.

11. The computer storage medium of claim 8, wherein failure of the control plane component is detected using a keep-alive messaging mechanism that employs an exchange of keep-alive and callback messages between software components running on one of:

a) separate control plane cards;

b) a common control plane cards; and c) a control plane card hosting the software component that has failed and a data/forwarding plane card in the network element.

* * * * *